Aug. 7, 1962   D. S. FOOTE ETAL   3,048,503
PICKLING APPARATUS AND METHOD
Filed June 19, 1958   9 Sheets-Sheet 5

Fig.6

Effect of Spacing on H and Gage Variation on Pickling Ti-8%Mn Sheet in 3%HF-20%HNO$_3$

United States Patent Office 3,048,503
Patented Aug. 7, 1962

3,048,503
PICKLING APPARATUS AND METHOD
Donald S. Foote and Ab Flowers, Beaver, Pa., and John P. Hubbell, Garden City, N.Y., assignors to Crucible Steel Company of America, Pittsburgh, Pa., a corporation of New Jersey
Filed June 19, 1958, Ser. No. 743,036
18 Claims. (Cl. 134—9)

This invention relates to the deskinning of metal, and more particularly to a method and apparatus for continuously pickling large metal sheets, especially rolled sheets of titanium, zirconium or the titanium or zirconium base alloys, at a uniform rate of metal removal and with minimum gauge variation.

Deskinning, which is frequently grouped with descaling under the common term "pickling" is an operation which is frequently carried out in the mill as a step in the process of producing metal articles and particularly metal sheets. In the case of the titanium and zirconium base materials, pickling is an operation which is required since these metals acquire a thin, surface embrittling skin due to absorption of oxygen when they are heated in air at temperatures necessary for rolling, heat treating, forging and the like. This brittle metal layer must be removed in order to produce products which will meet bending specifications. The embrittled layer is estimated to be between about 0.0005 and 0.0015 inch thick.

Most acids do not readily attack the titanium and zirconium base materials, and among those which do satisfactorily etch these metals the majority hydrogen-embrittle and/or deeply pit the surface. In the copending United States patent application of Milton B. Vordahl, Serial Number 435,755, filed June 10, 1954, now abandoned, several acid solutions are disclosed which at pickling temperatures between 100 and 190° F. remove surface metal with great rapidity and do not hydrogen-embrittle the aforementioned metals. The pickling baths therein disclosed include aqueous solutions consisting of about 0.5 to 10% by weight fluoride ions and either 15 to 30% nitric acid or 5 to 35% hydrogen peroxide, as well as 0.5 to 10% fluoride ions, 2 to 50% nitric acid and 0.5 to 30% hydrogen peroxide. The mechanism of metal attack by the pickling solutions and the chemical reactions involved are set forth in detail in said application. In the fluoride ion-nitric acid solution the reaction products are titanium tetrafluoride and nitric oxide which is immediately oxidized in air to the brown, poisonous nitrogen dioxide ($NO_2$). The fluoride-hydrogen peroxide solution pickles at approximately the same rate as the nitric acid bath, but without evolution of nitric oxide. Where the bath contains hydrogen peroxide in addition to fluoride ions and nitric acid the former effectively oxidizes the NO to $NO_2$ and finally to $HNO_3$ in the pickling solution. Of the pickling solutions disclosed in the aforementioned application, the nitric acid-fluoride ion solution is preferred, and contains from about 15 to 30% nitric acid, preferably 20 to 30%, and from about 2 to 4%, preferably 3–4%, hydrofluoric acid.

Pickling of titanium and titanium base alloy sheets has been and is presently carried out batchwise by placing a plurality of sheets on edge in a stainless steel rack and immersing the loaded rack in a tank containing the pickling solution. Fresh acid is added to the tank from time to time until the dissolved solids, titanium fluoride and other complex salts, have built up to about 5% by weight of the solution, after which the tank is emptied and filled with fresh acid. The spent acid is discarded and appreciable quantities of HF and $HNO_3$ are thus lost. No attempts have been made to recover the titanium values therefrom. Furthermore, as the procedure is now carried out it is exceedingly difficult if not impossible to produce sheets with sufficient uniformity of gauge to meet present specifications, particularly with the thinner gauge materials. The ability of pickled sheets to pass stricter gauge specifications would be an important competitive advantage.

Since the titanium or titanium base alloy metal removed in pickling is currently wasted, it is important that as little metal as possible be removed and yet the pickled sheets or articles must meet gauge and bending specifications. However, in the operation as presently conducted, it is not possible to accurately control the amount of metal removed and in most instances substantial quantities of the titanium in excess of the minimum needed for good bending are being discarded with the spent acid.

Perhaps the most significant drawbacks of the present method of pickling titanium and titanium base alloy sheets are the difficulty with which the depth of pickling can be accurately controlled and hydrogen diffusion. For example, by reason of the close proximity of adjacent sheets on the stainless steel rack the pickling rate on the sheets near the center of the rack is considerably different from the rate of metal removal from the outside sheets. Accordingly, wide gauge variations are the rule rather than the exception. It has also been found that where the pickling rate is excessive, substantial quantities of hydrogen are adsorbed by the metal, which hydrogen pick-up has a deleterious effect upon the brittleness of the sheet and upon its ability to resist stress corrosion cracking. The effects of undue hydrogen diffusion into the metal during pickling are set forth in detail in the aforementioned copending application. Hydrogen diffusion and pickling rate are affected by contact of one sheet with another as often occurs in the old rack type pickling arrangement due to sagging or bulging of the large sheets, as will be shown hereinafter.

In one of its aspects, the present invention provides a process for pickling metal articles and particularly sheets of titanium or titanium base alloys with a high degree of control both as respects pickling rate and uniformity of metal removal from all surfaces of the article. According to the method of the present invention broadly, a titanium base alloy sheet, for example, which has been hot rolled, descaled and quenched, is continuously conveyed through a body of aqueous pickling solution which is caused to flow relative to the moving sheet, and preferably caused to flow countercurrently of the direction of passage of the metal sheet therethrough. With careful control of the solution temperature, acid concentration, both as respects fluoride ions and nitric acid, and other variables detailed hereinafter, a surface layer of metal is quickly and uniformly removed from the sheet. The present invention contemplates introduction of the sheet to be pickled to the bath at a point below the liquid level therein, and passing the sheet continuously, and preferably horizontally disposed, at a uniform rate through the bath, with the sheet being removed at a point on the opposite side of the bath also below the upper surface of the pickling solution. Pickle liquor of a predetermined acid and fluoride ion concentration is continuously introduced to the bath and spent acid is withdrawn at points on either side of the sheet, the acid entry points being disposed adjacent the sheet exit and the withdrawal points adjacent the point of introduction of the sheet. As will be shown hereinafter, the rate of flow of the pickling solution with respect to the titanium base alloy sheet has an important bearing upon the rate of pickling, and this rate of flow is adjusted so as to assure an optimum rate. The sheet is preferably disposed horizontally as it is conveyed through the bath, although it may be inclined from the horizontal or disposed substantially vertically.

The present invention also contemplates addition of fresh acid to the system to maintain constant acid concentration, and the continuous removal of titanium fluoride from the pickling solution to maintain a substantially constant titanium ion concentration in the bath and accordingly permit a substantially constant pickling rate. Since the chemical reaction of titanium to form the fluoride during pickling is exothermic, liberating 120 to 210 KCal./mol Ti, the temperature of the bath tends to rise rather rapidly, and at higher temperatures the pickling rate increases. A method is provided for maintaining bath temperature substantially constant.

In the accompanying drawings.

Figure 1:
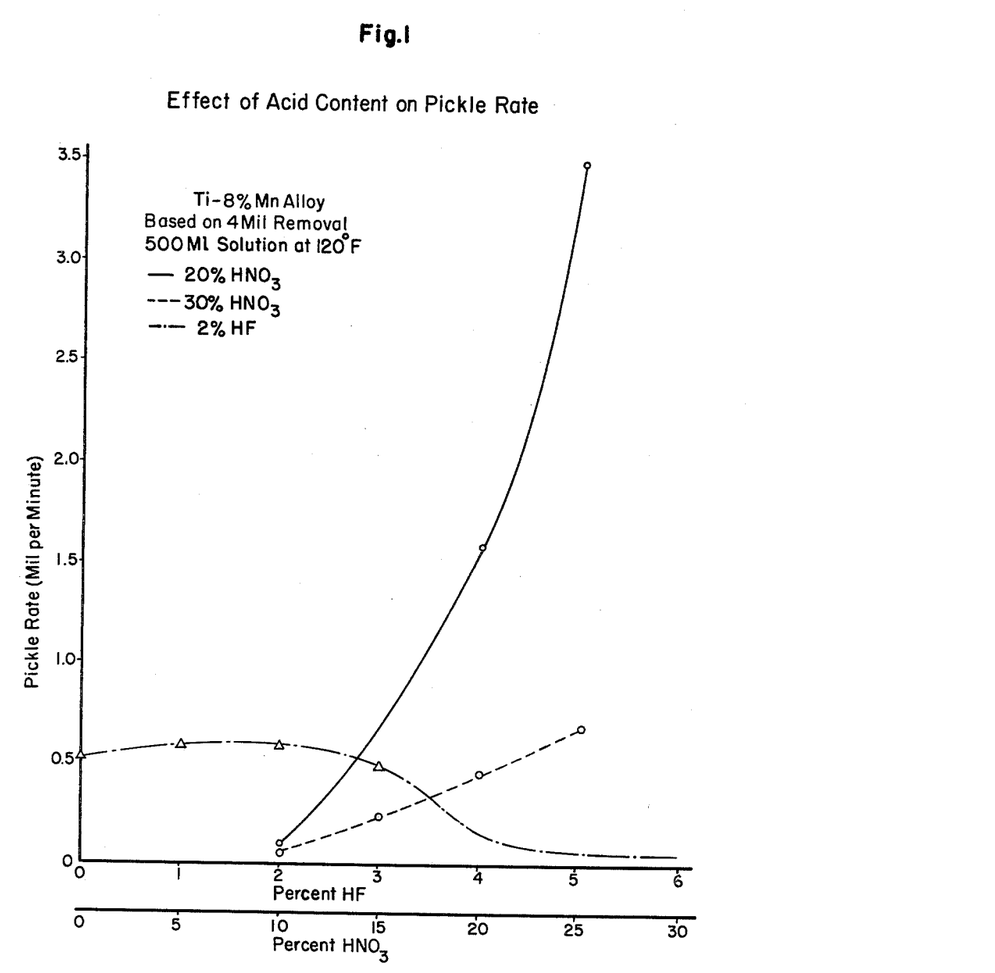
FIGS. 1–5 are a series of graphs plotted from test data illustrating the effect upon pickling rate, in mils per minute, of the acid content, titanium fluorides present, temperature of the bath, pickling solution velocity, and the effect of alloy composition, respectively, upon titanium and several of the important titanium base alloys.

It will be recalled that the preferred pickling solution contains from about 3 to 4% HF and from about 20 to 30% $HNO_3$. Referring now to FIG. 1 it is seen that small variations in HF have a greater effect on pickling rate in a 20% $HNO_3$ solution than in a 30% solution. Variations of $HNO_3$ in a 2% HF solution have little effect upon the rate below about 15% $HNO_3$, but above 20% the rate in the 2% HF solution is only about one-fifth that of the 2% HF-15% $HNO_3$ solution. Control of hydrogen adsorption dictates at least a 20–30% $HNO_3$ solution in which case HF is preferably between about 3 and 4%. At these constant nitric acid concentrations fluctuation in the fluoride ion concentration of the bath causes a marked change in the pickling rate, and it is important in order to maintain a constant rate available fluoride ion or HF in the bath be maintained substantially constant. The same is true of the nitric acid therein. Accordingly, the fluoride and $HNO_3$ concentration of the solution withdrawn from the bath is adjusted so that the solution returning to the bath has a substantially constant concentration.

Figure 3:
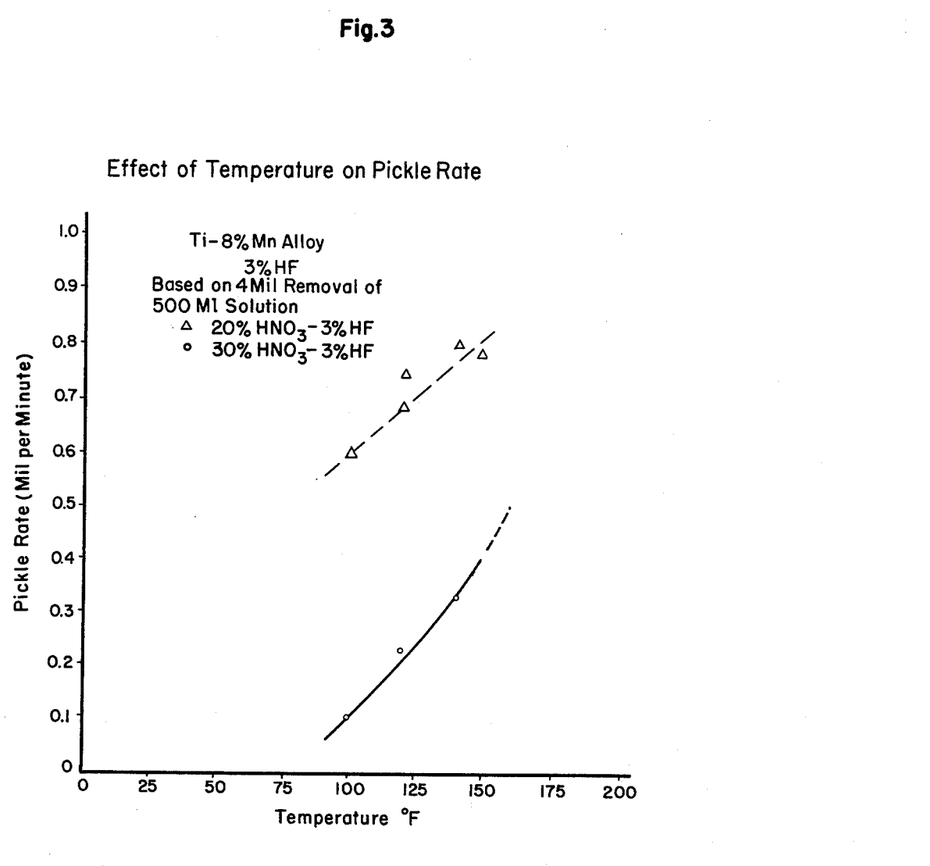

As seen in FIG. 3 the pickling rate in a given solution depends upon the bath temperature. As the temperature increases so also does the pickling rate, and thus to assure uniform removal of surface metal in a given time the bath should be maintained at a substantially constant temperature or controlled within fairly narrow limits. In accordance with the present process, the temperature of the pickling solution is maintained between about 100 and 140° F., preferably between 110 and 125° F. As a practical matter, prior to starting the pickling operation, the solution is preheated within the aforementioned range, although once pickling is started it is necessary to cool the solution withdrawn before it is returned to the bath.

Figure 2:
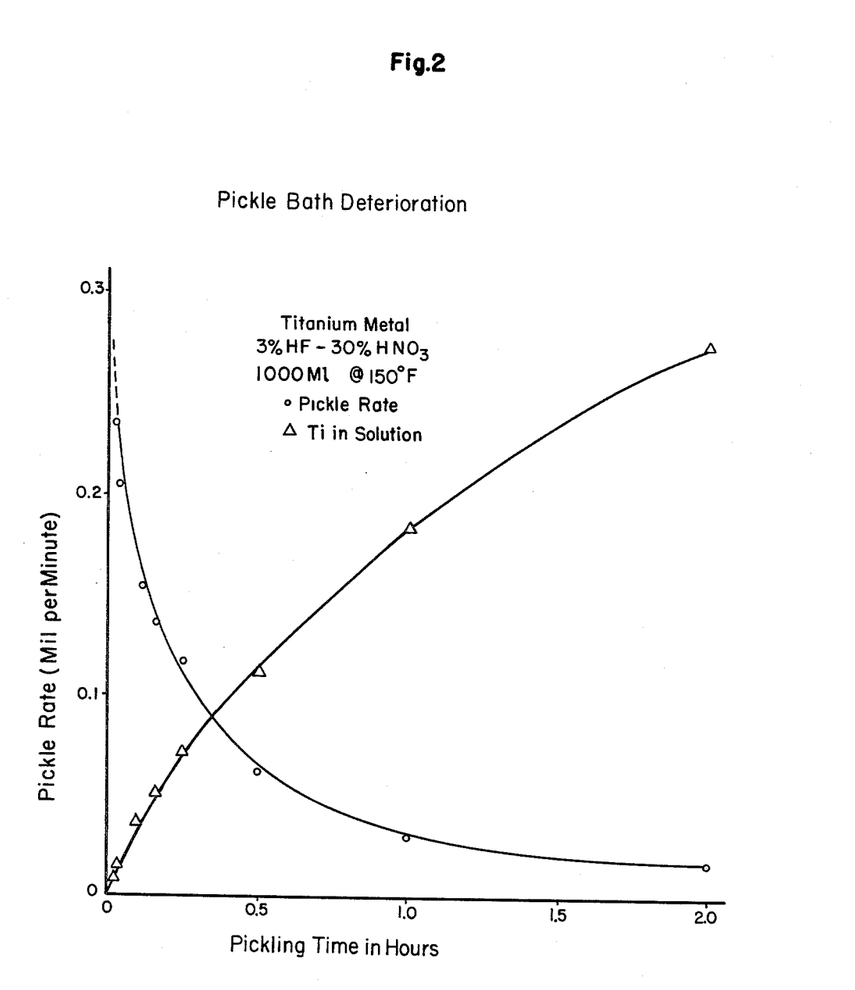

FIGURE 2 illustrates the effect of titanium fluoride and other titanium complex salts present in the pickling solution upon the pickling rate. It is readily apparent that the pickling rate falls off as titanium in the solution increases. Thus in order to maintain a substantially constant rate of attack it is important that the concentration of reacted titanium in the solution be maintained substantially constant. The titanium fluoride and titanium complex salts are appreciably soluble at pickling temperature, but drop out of solution in large measure when the solution is chilled to substantially room temperature. Accordingly, in the present process the solution continuously withdrawn from the bath is cooled sufficiently to allow titanium fluoride, etc. to precipitate. The precipitate is continuously removed from the stream preferably by passage through a carbon filter. Where excessive cooling is required for titanium removal from the stream, such as would lower the temperature of the bath below about 110° F. if the cooled solution were immediately returned thereto, heating means are provided in the recirculating system to raise the temperature of the returning stream to the necessary extent.

Figure 4:
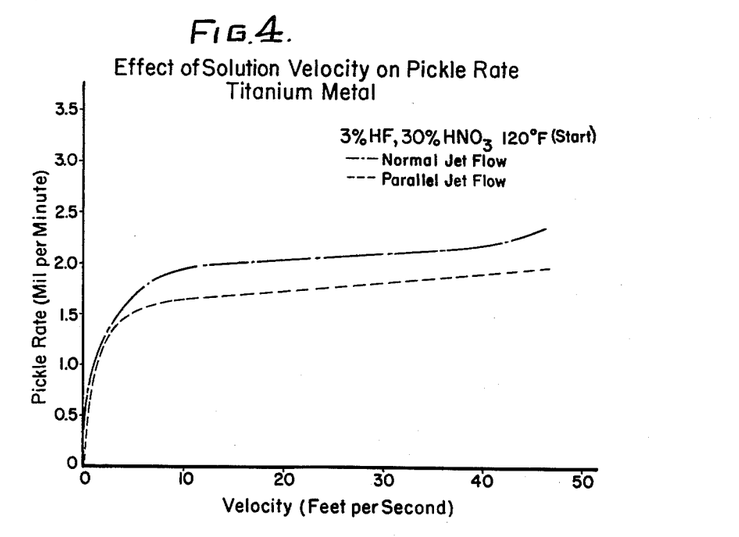

We have found that the velocity with which the pickling solution is directed at or passes the article being pickled has a direct bearing upon the rate of metal removal. This was established by directing a jet of 3% HF-30% $HNO_3$ solution maintained at 120° F. at a titanium sheet suspended in air. In one test the jet was positioned perpendicular to the sheet and flow directed normally onto the metal sample. In the other test jet flow was parallel or along the sheet. The results of these tests are represented graphically in FIG. 4, where it is seen that there is a break or knee in the rate of attack curve at a velocity of about 4 to 5 feet per second and the rate of attack below a solution velocity of about 5 feet per second is substantially different from that above this figure. Above about 5 feet per second, attack rate varies very little with velocity. Hence, solution velocity is a critical factor in the present process and is adjusted above the knee of the curve of FIG. 4. In the rack type batch pickling operation as hereinabove described the flow rate if any is erratic, and so also is the rate of attack.

Figure 6:
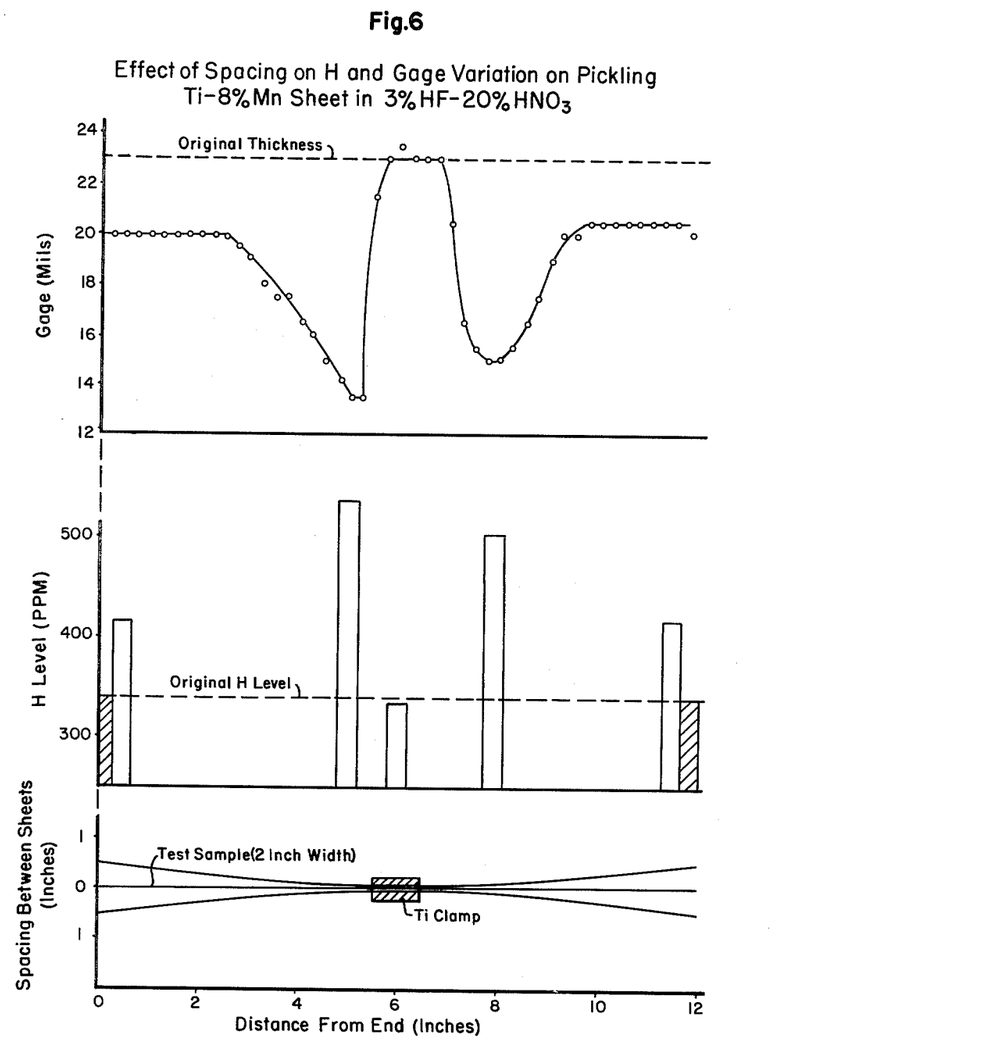
FIG. 6 is a graphic representation of the effect of spacing of the titanium base alloy sheets in a pickling bath containing 20% nitric acid and 3% hydrofluoric acid upon hydrogen diffusion and gauge variation in the finished sheet.

In order to observe the effect, if any, of contact between adjacent sheets as often occurs in the rack or batch pickling technique upon gauge variation and hydrogen diffusion, three Ti-8% Mn alloy sheets 12 inches long were fastened together at their center by means of a titanium clamp and wedged approximately one-half inch apart at their ends as indicated in FIG. 6. The so arranged sheets were pickled in a 3% HF-20% $HNO_3$ solution for a time calculated to remove a total of 3 mils from each sheet. Following pickling, hydrogen determinations were made at the positions indicated on the three samples and the results averaged and plotted on the bar graph of FIG. 6. The thickness of each of the sheets was also determined and the gauge averaged and also plotted over the length of each sheet. From the graphs it can be seen that the pickling rate and diffusion of hydrogen into the titanium base alloy are affected not only by contact but also by the proximity of adjacent sheets. The graphs show that where the sheets are widely separated the pickling rate is uniform and in accordance with the amount of metal that it is desired to remove. However, where there is only a slight separation between sheets there is a very appreciable increase in pickling rate and a gauge variation of up to 10 mils. Likewise, where this rapid pickling rate occurs the bar graph shows that there is a marked increase in hydrogen pick-up. In the process of the present invention the sheets are pickled singly so as to assure minimum gauge variation and hydrogen adsorption.

Figure 5:
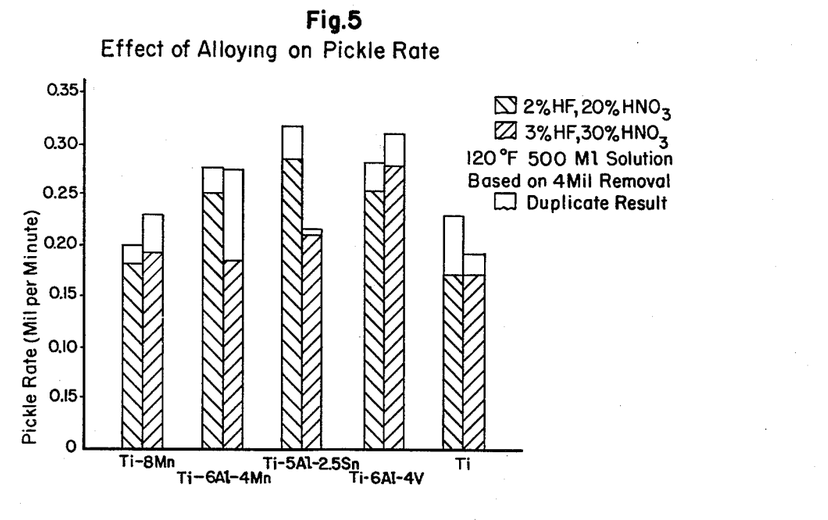

FIGURE 5 illustrates the pickling rate for various titanium base alloys in both 2% HF-20% $HNO_3$ and 3% HF-30% $HNO_3$ pickling solutions. Duplicate tests were carried out immersing each alloy in each solution and the white area of the bars represents the pickling rate with respect to one sample and the cross hatched area the rate of attack for the successive sample. Thus in order to remove a constant amount of metal from each different alloy sheet a different speed of travel through the pickling solution is required, as provided in the apparatus and method of the present invention.

In the prior art stainless steel rack pickling of titanium and titanium base alloys a galvanic current is set up between the titanium and the steel rack, titanium being cathodic with respect to the stainless steel. We have observed that depending upon the concentration of HF and HNO₃ in the pickling solution the pickling rate is substantially increased, particularly at the low cathodic current densities which are found in the titanium-stainless steel system. In accordance with the present invention on the other hand the titanium sheet material is conveyed through the pickling bath without contacting any metal surfaces and accordingly no galvanic effect which may vary the pickling rate is encountered.

The process of this invention thus takes into account acid concentration, bath temperature, solution velocity and the effect of dissolved metal in the bath, all critical factors in the uniform pickling to the aforementioned metal articles. In these respects alone it is far superior to any titanium or zirconium base material pickling methods extant.

Figure 7:
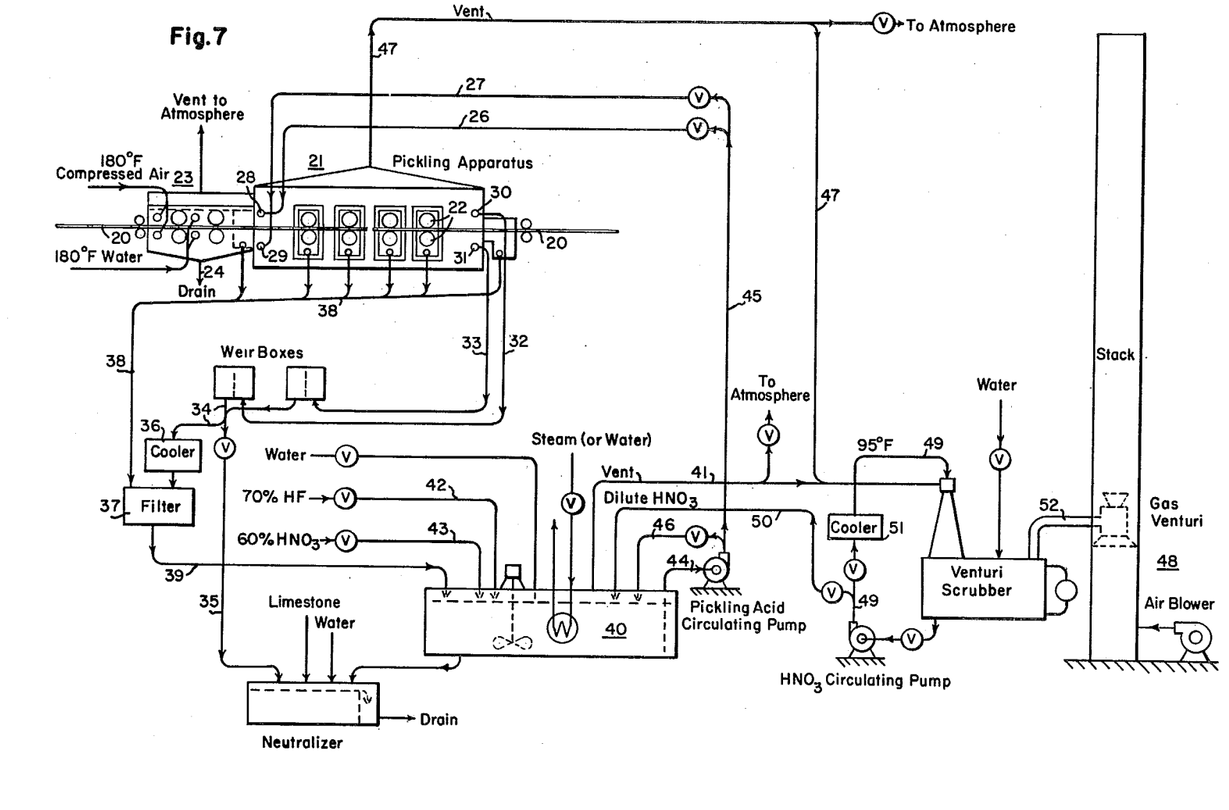
FIG. 7 is a schematic flow diagram of a continuous pickling process in accordance with the present invention.

Reference will now be had to the flow diagram of FIG. 7 for a complete description of the process and how the same may be carried out continuously. In the preferred embodiment, the titanium base alloy sheets 20 are passed into the pickling bath which is contained in tanklike apparatus designated generally as 21, between covered rollers 22 therein, out the opposite side of the apparatus and into a washing and drying zone indicated generally at 23. In the latter zone the pickled sheet is sprayed with water at approximately 180° F. and then dried with compressed air at about the same temperature. As indicated, the sheets to be pickled are introduced to the bath below the liquid level, and passed preferably horizontally through the solution in single file or in side by side relationship so that there is unobstructed contact between each side of the sheet and the pickling solution. The points of introduction and withdrawal of the sheets from the bath are so arranged that substantially equal volumes of pickle liquor are on either side of the sheet or line of traverse of the sheets through the bath.

In the bath, the sheet is contacted with a moving stream of pickling solution which is continuously introduced through lines 26 and 27 which communicate with the pickling apparatus through manifolds 28 and 29 positioned above and below the sheet respectively adjacent the sheet exit end. Upper and lower manifolds 30 and 31 carry the partially spent acid, for convenience referred to as spent acid hereinafter, from above and below the sheet at the sheet entering end of the bath to take-off lines 32 and 33. The pickling solution is thus caused to flow countercurrently of the direction of sheet travel both above and below the sheet, with fresh pickling solution introduced at the sheet exit end of the bath. Spent acid take-off lines 32 and 33 lead to a pair of weir boxes so arranged that the amount of liquor withdrawn from each side of the metal sheet can be maintained equal. The spent pickling acid leaves the weir box arrangement over line 34 which is provided with a valve through which controlled quantities can be bled from the system over line 35 to a neutralizer, to the plant waste acid disposal system or to an acid or titanium recovery system. The main stream of acid in line 34 is then cooled as at 36, after which it is filtered as at 37. Precipitated titanium fluoride and other complex titanium salts produced as a result of pickling are thus removed from the spent acid, and not allowed to build up in the circulating stream.

While substantially all of the spent acid withdrawn from the bath is carried over line 32 and 33, there is also a small outflow at the sheet entering and exit ends of the apparatus as well as the seals of rollers 22. Accordingly, spent acid from these points is collected and conveyed over line 38 to the filter 37.

The spent acid filtrate is conveyed through line 39 to a sump 40 of sufficient capacity to contain all of the pickling acid in the system, and also large enough so that minor variations in the bleed and feed will not materially change the composition of the solution which is ultimately returned to the bath. The sump tank is provided with means indicated in the flow diagram for thorough agitation of the acid solution as well as heating and cooling means, so as to maintain the liquid therein at a controlled temperature. The sump is preferably located so that all acid in the system will flow to it by gravity should the circulating pump stop. The sump is covered and the overhead connected through line 41 to a fume exhaust or scrubber.

To the acid in the sump, appropriate quantities of 70% hydrofluoric acid and 60% nitric acid are added through lines 42 and 43, respectifully, from the acid storage vessels to maintain the desired constant concentration in the active pickling solution. Also, at this stage temperature is adjusted to that necessary to assure a substantially constant temperature in the bath.

Active acid is continuously withdrawn from the sump through line 44 and pumped through return line 45 which communicates with the fresh pickle inlet distributing lines 26 and 27. Equal quantities of acid are thus fed to the bath above and below the sheet, thus completing the liquor circulating system. A valved by-pass line 46 on the pressure side of the pump enables control of the quantity of acid returned to the pickling bath. The quantity is such that the flow rate in the tank is as least 4 to 5 feet per second or higher with respect to the sheet therein. Suitable flow meters and valves are provided throughout the system in order to assure volume and acid concentration balance in the pickling bath.

A vent line 47 is provided in the overhead area of the pickling apparatus for exhausting the nitric oxide either to the atmosphere or to an absorption or recovery system such as is illustrated in FIG. 7. The vented gases from the pickling apparatus in line 47 and those from the sump in line 41 are desirably passed through a scrubber where they are contacted with dilute nitric acid. Reduced pressure in the vent lines and scrubber is provided by means of an air blower and gas venturi indicated generally at 48. In the scrubber dilute nitric acid is formed and withdrawn through line 49. A portion of this acid is returned over line 50 to the sump tank. The remainder of the dilute acid is cooled as at 51 to about 95° F. and contacted with gases in the scrubber. Gases which are not absorbed are conducted over conduit 52 to the gas venturi where they are diluted with air and exhausted to the atmosphere.

While the process has been described as continuous and details of the recirculating system have been set forth, the present invention is not limited to any specific recirculating sequence. In its broadest aspect the invention contemplates passage of the sheets through a moving bath of pickle liquor maintained at a substantially constant average temperature and acid content and containing a substantially constant average quantity of dissolved titanium. Furthermore, the said bath is itself caused to flow relative to the moving sheet. The relative rate of such flow is greater than about 5 feet per second. In this view of the process, the same encompasses simply introduction of fresh acid to the bath and withdrawal of partially spend acid therefrom.

Figure 8:
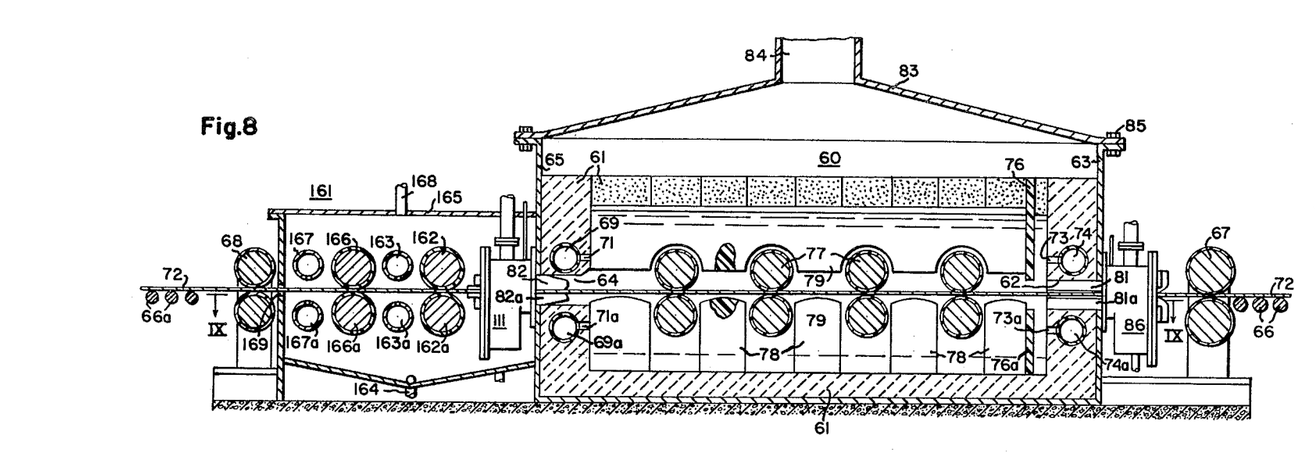
FIG. 8 is a sectional elevation of the pickling apparatus.
Figure 9:
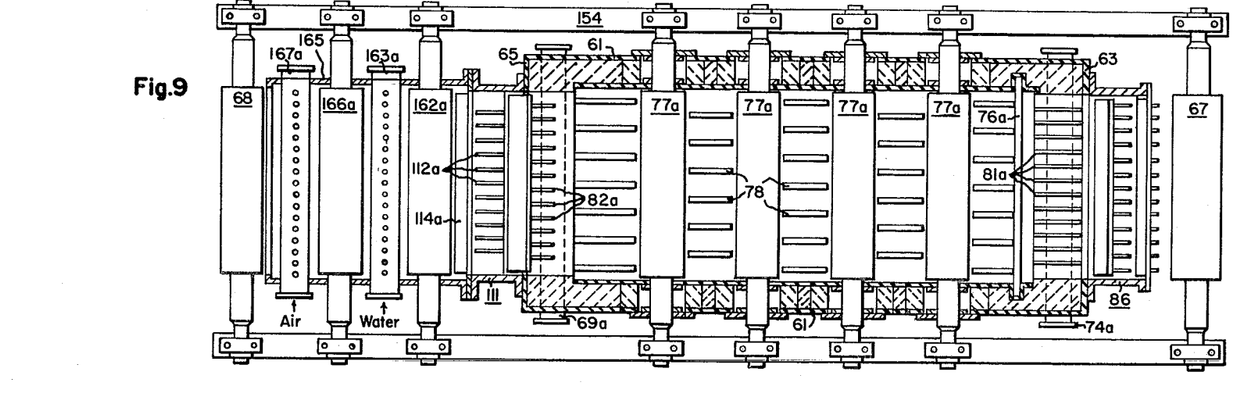
FIG. 9 is a transverse section of the apparatus taken on the line 9—9 of FIG. 8.

Referring now to the pickling apparatus in detail and particularly to FIGS. 8 and 9, the preferred apparatus comprises a rectangular vessel or tank designated 60, preferably of steel with its interior surface provided with a pickling acid resistant lining 61 such as a plastic material or carbon bricks. A transverse sheet entering slot 62 is provided in end wall 63 of the tank, and directed opposite a similar sheet exit or discharge slot 64 is provided in end wall 65. The slots are in-line and at or below the horizontal center line of the tank. They are also aligned with conveyors 66 and 66a and exterior pinch rolls 67 and 68 at the sheet entering and exit ends of the tank respectively. A pair of pickle liquor inlet manifolds 69 and 69a are provided in the exit end wall 65, one above and one below slot 64, with a plurality of openings 71 and 71a respectively therein which communicate with the interior of the tank. As seen in FIG. 8, approximately equal volumes of liquor are above and below the sheet 72. A plurality of acid discharge openings 73 and 73a are provided above and below entering slot 62 which communicate with discharge manifolds 74 and 74a respectively. During pickling, acid is introduced by way of manifolds 69 and 69a and withdrawn from the tank through manifolds 74 and 74a. In the embodiment illustrated pickle liquor thus flows countercurrently to the direction of sheet travel through the apparatus. Upstanding members 76 and 76a above and below sheet 72 and adjacent manifolds 74 and 74a respectively, reduce channelling of the flowing liquor assuring its intimate contact with the sheet just inside slot 62. These members also serve to support the edges of sheet guides described hereinafter.

A plurality of spaced plastic covered roller pairs 77—77a, one roll of each being driven by means not shown, are positioned in the tank for conveying the metal sheet therethrough. The number of roller pairs will of course depend upon the length of the sheets being pickled and the overall length of the bath. A plurality of upstanding plastic guide members 78 are disposed between each of the roller pairs for directing the leading edge of the metal sheet through each succeeding roller pair or exit slot 64 as the case may be, should the sheet tend to warp or curl. A plurality of overhead guides 79, one of which is shown in FIG. 8, are proivded above the sheet for the same purpose. The upper and lower guides are fairly narrow, and preferably staggered, see guides 78 in FIG. 9, so as to permit free flow of pickle liquor above and below the metal sheet. Referring again to the slot 62 in the sheet entering end of the tank, see FIG. 10, upper and lower sets of plastic guides 81 and 81a are suitably mounted therein and secured to the end wall 63 and lining 61. Similar guide sets 82—82a are mounted in exit slot 64. The guides 81—81a and 82—82a may if desired each consist of only one upper and one lower member which extends over the length of the slot.

All metal surfaces of the apparatus in contact with the pickle liquor or likely to come in contact with the same are lined with material capable of resisting attack by the liquor. The tank itself is preferably lined with carbon bricks. All pipes or manifolds and members which do not come in direct contact with the sheets being pickled are preferably constructed of rigid polyvinylchloride or lined with the more flexible plastics which are resistant to attack by HF—HNO₃ solutions. Examples of the latter types are: Du Pont's "Teflon" brand of tetrafluoroethylene polymer, and M. W. Kellogg's "Kel-F" brand of trefluorochloroethylene polymer, and flexible polyvinylchloride. The latter more flexible materials are the preferred materials of construction for the several sheet guides and seals in the apapratus as well as for the roller covers.

An exhaust hood 83 which is fitted with a stack 84 for removal of gases formed during pickling is mounted as at 85 on the open top of tank 60.

Since the entering and exit slots in the tank ends are below the acid level provision must be made for an acid seal around the sheet at these points. In the right hand portion of FIG. 10 it will be observed that the seal comprises a box designated generally as 86 having a flanged body member 87 which is secured as at 88 to the tank end 63 covering slot 62. A cover member 89 secured as at 91 to the body 87 completes the box assembly. Both body and cover are provided with openings 92 and 93 respectively in-line with tank slot 62. Sheet guides 94—94a are mounted inside the box and exterior guides 95—95a serve to direct the entering sheet 72 into opening 92 and thence between slot guides 81—81a. It will be noted that body member 87 is constructed with a portion 96 of substantial thickness adjacent the tank. A flexible inner seal comprises upper and lower plastic sheets 97—97a, which are secured to the inner wall of body portion 96 and project into opening 92 substantially completely filling the same. The sealing sheets are in direct contact with the upper and lower surface of the entering metal sheet 72. These inner seals are preferably Teflon, or they are provided with wear-resistant Teflon surface sheet 98 and 98a.

Figure 10:
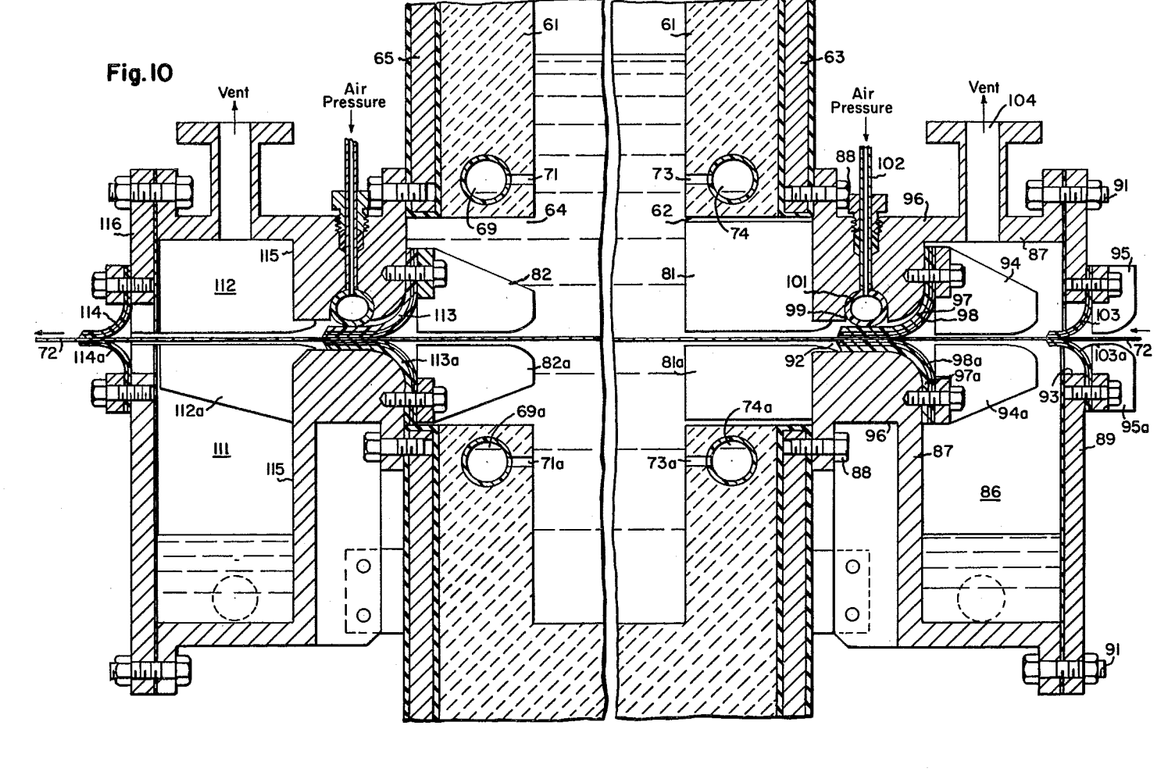
FIG. 10 is a partial sectional elevation of the apparatus showing details of the seal box assembly at both the sheet entry and exit points.

A generally circular undercut opening 99 is provided in the body portion 96 adjacent opening 92 wherein a plastic hose 101 is disposed over the length of seal sheet 97. The hose is connected through line 102 to a regulated supply of compressed air. When pressure is applied, hose 101 expands, forcing sealing sheet 97 against the moving metal sheet and the latter against lower sealing sheet 97a, thus preventing any substantial out-flow of pickle liquor through slot 92.

An outer seal is provided in the opening 93 in the box cover. It comprises upper and lower sheets 103—103a, similar to those of the inner seal, which rub over the surfaces of metal sheet 72.

This double seal arrangement is designed to control pickle liquor leakage to the point where it is not a critical factor in the quantity of acid handled. Leakage which does occur at the inner seal collects in the base of the box 86 and is withdrawn through the drain therein and preferably added to the spent acid being circulated to the sump. Nitrogen oxides liberated from the liquor collecting in the base of the box are discharged through overhead vent 104.

Referring now to the left-hand portion of FIG. 10, the sealing box 111 about sheet exit slot 64 is constructed substantially the same as box 86, with the exception that the interior plastic guides therein, designated 112 and 112a are of different shape as shown in the drawing. Also, the inner and outer plastic seals 113—113a and 114—114a are both exteriorly secured to the respective body 115 and cover 116 portions of the box. The box is provided with a vent and a drain and functions as does sheet entering sealing box 86.

Figure 11:
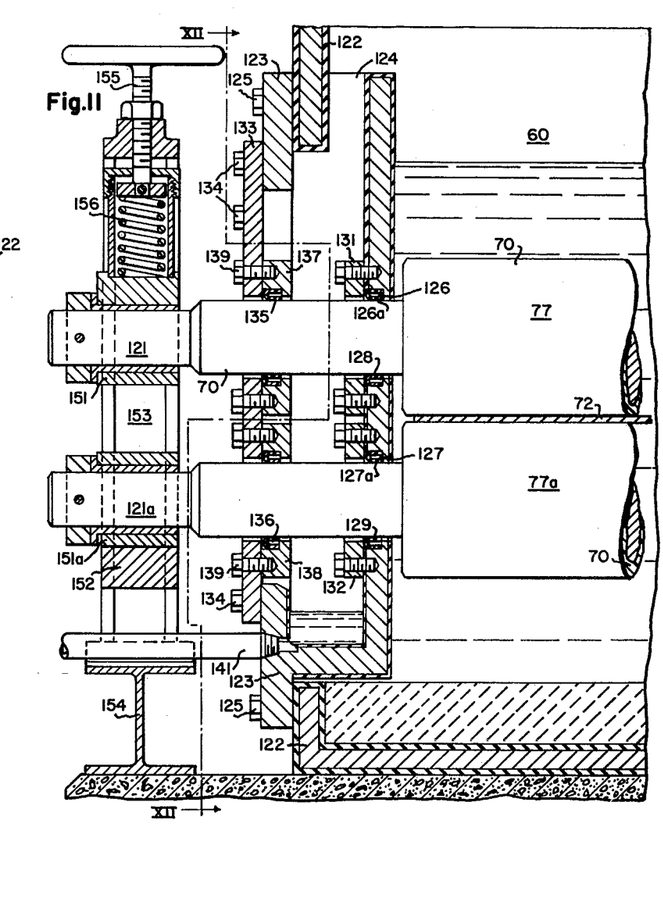
FIGURE 11 is a detailed sectional elevation of one of the roller seal boxes in the side of the pickling apparatus.
Figure 12:
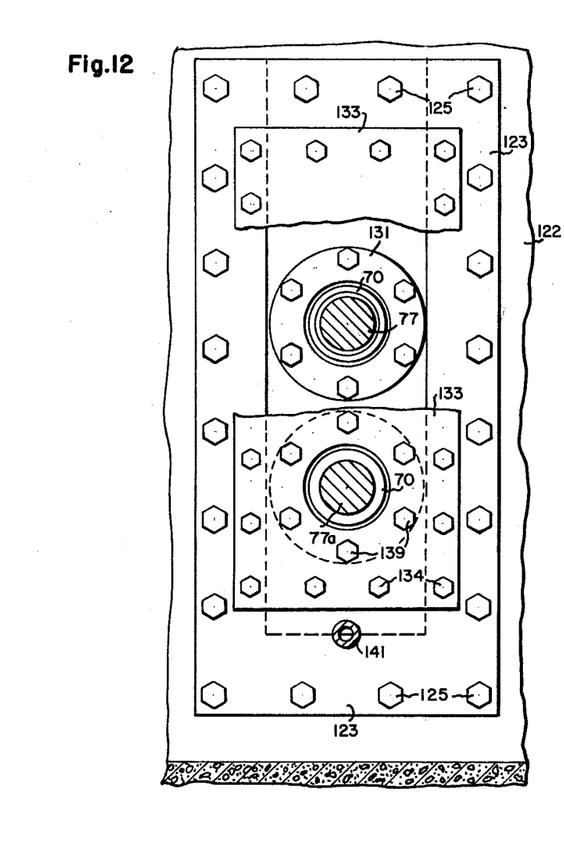
FIG. 12 is a partial sectional elevation of the seal box taken on the line 12—12 of FIG. 11.

Referring now to FIGS. 11 and 12, the shafts 121 and 121a of each roller pair 77—77a, which are covered as are the rollers with plastic material 70, project through each side 122 of the pickling apparatus 60 below the liquid level in the tank. In accordance with the present invention a sealing box is provided for each roller pair on each side of the tank. One such preferred sealing box with inner and outer seals is illustrated. It comprises an insert member 123, having an overhead gas vent opening 124 therein, which fits into an opening in the side 122 of the tank and is secured in position as by studs 125. Insert 123 is provided with openings 126 and 127 for the passage of roller shafts 121 and 121a, said openings being notched as at 126a and 127a for receiving circular, expanding Teflon sealing rings 128 and 129 respectively, preferably of the cross-section indicated. Circular cover plates 131 and 132 maintain the sealing rings in position. The above constitutes the inner seal.

A cover member 133 for insert 123 which is secured thereto as by studs 134 completes the box structure. The cover is adapted for passage of the shafts therethrough, and a circular, expanding Teflon sealing ring 135 is positioned about shaft 77 just inside the cover 133, and a similar ring 136 encompasses shaft 77a at the same relative position. The respective rings are held in the position illustrated by notched circular cover plates 137 and 138 which are secured to cover member 133 by studs 139. Pickle liquor passing through the inner seals collects in the lower hollow portion of the box and is withdrawn through drain 141 therein and joins the spent acid circulated to the sump. Any liquor which passes the inner seal and tends to flow along the covered roller shafts is obstructed by the outer sealing rings. The steel roller shafts are nevertheless plastic covered for some distance beyond the outer sealing rings, as shown in FIG. 11, to prevent possible corrosion damage through failure of the seals.

The uncovered projecting portions of shafts 121 and 121a rest in suitable bearing boxes designated 151 and 151a. The bearings are spring loaded, with the lower box assembly 151a adjustably secured as at 152 to guideway 153 which is supported by a frame 154. Roller pressure is adjusted by means of screw 155 which controls the degree of compression in spring 156, thus causing bearing box 151 to move upwardly or downwardly in guideway 153. One of the roller shafts, preferably the lower one, is driven by means not shown.

Referring again to FIGS. 8 and 9, in one embodiment of the apparatus of the present invention sheet washing and drying means are provided adjacent the exit end of the pickling tank. This facility, indicated generally at 161, is positioned exteriorly of the exit sealing box and includes a plastic covered guide roller pair 162—162a and a pair of horizontally disposed water spray headers 163 and 163a, above and below sheet 72 respectively, through which water at about 180° F. is sprayed onto each side of the sheet, thus flushing residual pickle liquor from the sheet which is discharged through drain 164 in the base of enclosure 165. A second roller pair 166—166a guides the sheet between upper and lower headers 167 and 167a through which compressed air also at about 180° F. is played onto the sheet thus drying the same. An air exhaust vent 168 is provided in the enclosure cover. The guide rollers and water and air spray headers as well as a slot 169 in the enclosure end are all aligned with slot 64 in end wall 65 of the pickling tank and exterior pinch rollers 68.

What is claimed is:

1. A process for pickling titanium and zirconium base metal sheets which comprises introducing a sheet to be pickled to a circulating body of pickle liquor, comprising an aqueous solution of about 2 to 4% hydrofluoric and about 15 to 30% nitric acid at about 100–140° F. below the surface thereof, advancing the sheet through said body, continuously withdrawing substantially equal volumes of partially spent liquor from each side of said sheet adjacent the point of introduction of the sheet to said body, cooling the withdrawn liquor and separating precipitated metal values therefrom, adjusting the hydrofluoric and nitric acid concentration of the partially spent liquor upward while adjusting the temperature of said liquor, continuously returning substantially equal volumes of so adjusted liquor to the body on each side of the sheet therein adjacent the point of withdrawal of the pickled sheet, thereby to provide countercurrent flow of liquor above and below the sheet relative to the direction of sheet travel in the body, and adjusting the liquor flow rate above about 4 to 5 feet per second with respect to said sheet.

2. Apparatus for pickling a metal sheet which comprises a vessel for containing pickling liquor, the opposed ends of said vessel being slotted, one for introduction and the other for withdrawal of the sheet, a plurality of substantially parallel roller pairs, at least one roller of each pair being driven, disposed in said vessel substantially normally of the pathway of travel of said sheet for conveying the same through said vessel, sealing means adjacent the slotted portion of said vessel ends in contact with the sheet passing therethrough for substantially reducing outflow of liquor through said slotted portions, conduit means above and below the pathway of travel of said sheet adjacent one slotted end wall of the vessel for introducing pickling liquor thereto and conduit means above and below the pathway of travel of said sheet adjacent the opposed vessel end for withdrawing partially spent liquor from the vessel.

3. Apparatus as set forth in claim 2 wherein the conduit means for introducing pickling liquor to the vessel are positioned adjacent the vessel end through which the sheet is withdrawn.

4. Apparatus for pickling a metal sheet which comprises a vessel for containing pickling liquor, the opposed ends of said vessel being slotted substantially parallel to the horizontal midsection of said vessel below the level of the liquor to be contained therein, one for introduction and the other for withdrawal of the sheet, a plurality of parallel roller pairs, at least one roller of each pair being driven, disposed in said vessel below the liquid level and substantially normal of the pathway of travel of the sheet for conveying the same through said vessel, the shaft ends of said rollers projecting through the opposed sides of said vessel, sealing means associated with the vessel sides where the roller shafts project therethrough, sealing means adjacent the slotted portion of each of said vessel ends in contact with the sheet passing therethrough for substantially reducing outflow of liquor through said slotted portion, a pickling liquor conduit adjacent the slotted portion of each of said vessel ends communicating with the interior of said vessel both above and below the pathway of said sheet therein and below the normal level of liquor in said vessel during pickling, one said conduit for introduction to and one for withdrawal of pickling liquor from said vessel.

5. Apparatus as set forth in claim 4 wherein said opposed vessel ends are slotted below the horizontal midsection of said vessel.

6. Apparatus as set forth in claim 4 wherein said roller pairs and the slotted portion of each vessel end are in substantial alignment.

7. Apparatus as set forth in claim 5 including a pair of pinch rolls disposed exteriorly of each said vessel ends and substantially aligned with the interior roller pairs.

8. Apparatus for pickling a metal sheet which comprises a vessel for containing pickling liquor, the opposed ends of said vessel being slotted substantially parallel to the horizontal midsection of said vessel below the level of the liquor to be contained therein, one for introduction and the other for withdrawal of the sheet, a plurality of parallel roller pairs, at least one roller of each pair being driven, disposed in said vessel below the liquid level and substantially normal of the pathway of travel of the sheet for conveying the same through said vessel, the shaft ends of said rollers projecting through the opposed sides of said vessel, a plurality of juxtaposed guide members positioned intermediate each of said roller pairs for directing the sheet into the bite of the succeeding roller pair, sealing means associated with the vessel sides where the roller shafts project therethrough, sealing means adjacent the slotted portion of each of said vessel ends in contact with the sheet passing therethrough for substantially reducing outflow of liquor through said slotted portion, a pickling liquor conduit adjacent the slotted portion of each of said vessel ends communicating with the interior of said vessel both above and below the pathway of said sheet therein and below the normal level of liquor in said vessel during pickling, one said conduit for introduction to and one for withdrawal of pickling liquor from said vessel.

9. Apparatus for pickling a metal sheet which comprises a vessel for containing pickling liquid, the opposed ends of said vessel being slotted substantially parallel to the horizontal midsection of said vessel below the level of the liquor to be contained therein, one for introduction and the other for withdrawal of the sheet, a plurality of parallel roller pairs, at least one roller of each pair being driven, disposed in said vessel below the liquid level and substantially normal of the pathway of travel of the sheet for conveying the same through said vessel, the shaft ends of said rollers projecting through the opposed sides of said vessel, sealing means associated with the vessel sides where the roller shafts project therethrough comprising a projecting box structure with an insert member secured to said vessel side adapted to permit passage of said shafts therethrough, a pair of inner sealing rings, one in contact with each said shaft of said pair, supported at least in part by said insert member, a cover plate for said insert secured thereto completing said box structure, said cover plate also being adapted for passage of said shafts therethrough, a pair of outer sealing rings, one in contact with each shaft, adjacent to and supported by said cover, the lower portion of said box structure being adapted to permit collection and withdrawal therefrom of pickling liquor passing said inner seal, sealing means adjacent the slotted portion of each of said vessel ends in contact with the sheet passing therethrough for substantially reducing outflow of liquor through said slotted portion, a pickling liquor conduit adjacent the slotted portion of each of said vessel ends communicating with the interior of said vessel both above and below the pathway of said sheet therein and below the normal level of liquor in said vessel during pickling, one said conduit for introduction to and one for withdrawal of pickling liquor from said vessel.

10. Apparatus for pickling a metal sheet which comprises a vessel for containing pickling liquor, the opposed ends of said vessel being slotted substantially parallel to the horizontal midsection of said vessel below the level of the liquor to be contained therein, one for introduction and the other for withdrawal of the sheet, a plurality of parallel roller pairs, at least one roller of each pair being driven, disposed in said vessel below the liquid level and substantially normal of the pathway of travel of the sheet for conveying the same through said vessel, the shaft ends of said rollers projecting through the opposed sides of said vessel, sealing means associated with the vessel sides where the roller shafts project therethrough, sealing means comprising a box structure positioned exteriorly of said vessel adjacent each of its slotted ends, including a flanged body member provided with a lateral opening communicating with the slotted portion of said end secured to said vessel end, a slotted cover member secured to said body thus completing said box structure, a pair of flexible sealing sheets secured to said cover, one adjacent each side of the slot therein adapted to wipe over the metal sheet passing through said cover slot, a second pair of flexible sealing sheets secured to said body member, one adjacent each side of the slot and extending into said slot adapted to wipe over the metal sheet as the same passes therethrough with the lower portion of said box structure adapted to permit collection and withdrawal therefrom of pickling liquor passing the second pair of flexible sealing sheets, a pickling liquor conduit adjacent the slotted portion of each of said vessel ends communicating with the interior of said vessel both above and below the pathway of said sheet therein and below the normal level of liquor in said vessel during pickling, one said conduit for introduction to and one for withdrawal of pickling liquor from said vessel.

11. Apparatus as set forth in claim 10 wherein said body member is recessed along the slot therein, an expandible member disposed in said recess adjacent said slot over the length of the latter, said member upon expansion exerting pressure upon said second pair of flexible sealing sheets.

12. A process for pickling elongated metallic sections comprising advancing a section through an enclosed pickling zone at an elevated temperature, introducing a stream of acidic pickling fluid at points above and below the pathway of travel of said section, flowing said stream comprising a solvent and a solute possessing a substantial vapor pressure at the temperature within said zone through said zone countercurrently to said section at a rate above about 4 to 5 feet per second collecting a gaseous portion of said fluid volatilized within said zone, reconstituting the gaseous portion to liquid form by absorbing the same in dilute solvent, maintaining the temperature within said zone substantially constant, and maintaining the composition of said fluid substantially constant by adding thereto predetermined quantities of reconstituted fluid, solvent and solute.

13. A process for removing constant, predetermined amounts of metal from articles of titanium and alloys thereof, comprising introducing an article into an enclosed article-treating zone containing a pickling bath comprising an aqueous solution containing from about 2 to about 4 percent of hydrofluoric acid and from about 15 to about 30 percent of nitric acid, maintaining the article below the surface of said bath at all times while within the article-treating zone, continuously flowing said bath about said article at a rate of about 4 to 5 feet per second relative thereto and countercurrently of the advancement thereof, continuously removing a portion of the bath from the article-treating zone to an enclosed bath-treating zone, separating titanium fluoride and titanium complex salts from the removed portion of the bath, adjusting the temperature of the bath in the bath-treating zone to a degree to maintain the temperature of the bath in the article-treating zone between about 100° F. and 140° F., recovering volatilized nitrogen oxides from said zones, adjusting the composition of the bath within the bath-treating zone by addition thereto of necessary amounts of make-up acids, water and recovered nitrogen oxides.

14. A process for pickling elongated sections for titanium, zirconium and alloys thereof comprising advancing a section through an enclosed pickling zone maintained at a substantially constant elevated temperature, flowing a stream of pickling liquor through said zone at a rate of at least 4 to 5 feet per second relative to said section, said liquor comprising an aqueous solution of hydrofluoric and nitric acids, collecting a gaseous portion of said liquor volatilized within said zone and comprising nitrogen oxides, reabsorbing the nitrogen oxides in a solvent selected from the group consisting of water and dilute nitric acid, and maintaining the composition of said liquor substantially constant by removing therefrom dissolved metallic values and by adding thereto necessary amounts of reabsorbed nitrogen oxides, water and make-up acids.

15. A process for pickling elongated metallic sections comprising advancing a section through an enclosed pickling zone, circulating a stream of acidic pickling fluid at a predetermined rate from an enclosed storage zone through said pickling zone countercurrently to the travel of said section, said stream being introduced at points above and below the pathway of travel of said section, said fluid comprising a solvent and a volatile solute, collecting gaseous portions of said fluid volatilized within said zones, forming reconstituted fluid by absorbing said gaseous portions in dilute solvent, maintaining the temperature of said fluid substantially constant, and maintaining the composition of said fluid substantially constant by continuously removing therefrom dissolved metallic values and by continuously adding thereto necessary amounts of acid, solvent and said reconstituted fluid.

16. Apparatus for pickling elongated sections of titanium, zirconium and alloys thereof comprising a pickling tank designed to hold a quantity of pickling liquor, said liquor comprising an aqueous solution of from about 2 to about 4 percent of hydrofluoric acid and from about 15 to about 30 percent of nitric acid, opposite extremities of said tank being provided with mutually aligned slots for the entry of said sections into and the exits of said sections from said tank, said slots being positioned at about the midpoint of the height of said liquor within said tank, resilient means within said slots and conformable to the peripheral shape of said sections to seal said slots against loss of liquor therethrough, means to convey said sections through said tank, means for introducing said liquor at points above and below the pathway of travel of said sections, means to circulate said liquor through said tank in a direction countercurrent to the direction of travel of said sections and at a rate of at least 4 to 5 feet per second relative to said sections, and means to maintain substantially constant the temperature, dissolved metal and acid contents of said liquor.

17. Apparatus for pickling elongated metallic sections comprising an enclosed pickling tank designed to hold a quantity of volatile, acidic pickling liquor within said tank, means to advance said sections through said liquor in said tank, means for introducing said liquor at points above and below the pathway of travel of said sections, an enclosure designed to hold a reservoir of said liquor, means to circulate said liquor between said reservoir and said tank and countercurrently to the advancement of said sections, means to maintain said liquor at a substantially constant elevated temperature, means to collect volatilized gaseous portions of said liquor from said tank and said reservoir, means to reconstitute said gaseous portions by absorbing the same in dilute liquor solvent, and means to maintain said composition of the liquor substantially constant comprising means to continuously remove dissolved metallic values from said liquor and means to feed to said reservoir necessary amounts of acid, solvent and reconstituted liquor.

18. Apparatus for pickling elongated sections of titanium, zirconium and alloys thereof comprising an enclosed pickling tank designed to hold a quantity of pickling liquor within said tank and comprising an aqueous solution of hydrofluoric and nitric acids, means to advance said sections through said liquor, means for introducing said liquor at points above and below the pathway of travel of said sections, and enclosure designed to hold a reservoir of said liquor, means to circulate said liquor between said reservoir and said tank and countercurrently to the advancement of said sections at a substantially constant rate of at least 4 to 5 feet per second relative to said sections, means to maintain said liquor at a temperature within the range of about 100–140° F., means to collect nitrogen oxides volatilized within said reservoir and said tank, means to absorb said nitrogen oxides in a solvent selected from the group consisting of water and dilute nitric acid, means to continuously remove from said liquor metallic values dissolved from said sections, and means to continuously add to said liquor amounts of acids, water and reabsorbed nitrogen oxides thereby to maintain the desired acid content of said liquor.

References Cited in the file of this patent

UNITED STATES PATENTS

| | | |
|---|---|---|
| 1,355,357 | Quinan | Oct. 12, 1920 |
| 1,676,277 | Mumford | July 10, 1928 |
| 1,837,159 | Fellows | Dec. 15, 1931 |
| 1,859,736 | George | May 24, 1932 |
| 1,954,744 | Peterson et al. | Apr. 10, 1934 |
| 2,212,588 | Csanyi | Aug. 27, 1940 |
| 2,255,859 | Quigley | Sept. 16, 1941 |
| 2,418,386 | Wood | Apr. 1, 1947 |
| 2,428,221 | Hudson | Sept. 30, 1947 |
| 2,491,919 | Egly | Dec. 20, 1949 |
| 2,522,071 | Tait | Sept. 12, 1950 |
| 2,608,982 | Zademach et al. | Sept. 2, 1952 |
| 2,676,599 | McHenry | Apr. 27, 1954 |
| 2,721,562 | Irvine | Oct. 25, 1955 |
| 2,811,424 | Ackerman | Oct. 29, 1957 |
| 2,876,144 | Bomberger | Mar. 3, 1959 |
| 2,918,069 | Brown et al. | Dec. 22, 1959 |